United States Patent [19]

Nagasaki

[11] Patent Number: 4,704,291

[45] Date of Patent: Nov. 3, 1987

[54] METHOD OF PREPARATION OF FISH-NOODLE

[76] Inventor: Kousuke Nagasaki, Kabushiki-kaisha, Irifune, Noda 4-chome 1-41, Fukushima-ku, Osaka-shi, Osaka-fu, Japan

[21] Appl. No.: 800,383

[22] Filed: Nov. 21, 1985

[30] Foreign Application Priority Data

Aug. 29, 1985 [JP] Japan .................................. 60-190579

[51] Int. Cl.⁴ ........................ A22C 25/20; A23L 1/325
[52] U.S. Cl. .................................... 426/513; 426/517; 426/643
[58] Field of Search ............... 426/643, 513, 517, 802, 426/657

[56] References Cited

U.S. PATENT DOCUMENTS

| | | | |
|---|---|---|---|
| 4,301,181 | 11/1981 | Simon et al. ..................... | 426/643 X |
| 4,303,688 | 12/1981 | Shimura et al. ................. | 426/643 X |
| 4,340,612 | 7/1982 | Askman et al. .................. | 426/802 X |
| 4,396,634 | 8/1983 | Shenouda et al. ............... | 426/643 X |
| 4,494,356 | 1/1985 | Takiguchi ....................... | 426/513 X |
| 4,517,218 | 5/1985 | Yackel, Jr. et al. ............ | 426/802 X |
| 4,544,561 | 10/1985 | Komukai ......................... | 426/643 X |
| 4,584,204 | 4/1986 | Nishimura et al. ............. | 426/643 |
| 4,588,601 | 5/1986 | Maruyama et al. ............ | 426/643 X |

*Primary Examiner*—Robert Yoncoskie
*Attorney, Agent, or Firm*—Fleit, Jacobson, Cohn & Price

[57] ABSTRACT

A mashed fish paste is formed into a thin sheet and heated in an oven to gel said sheet. The gelled sheet after heating is cooled and then cut into slender fibrous bodies. The fibrous bodies are further cut into suitable lengths.

3 Claims, 1 Drawing Figure

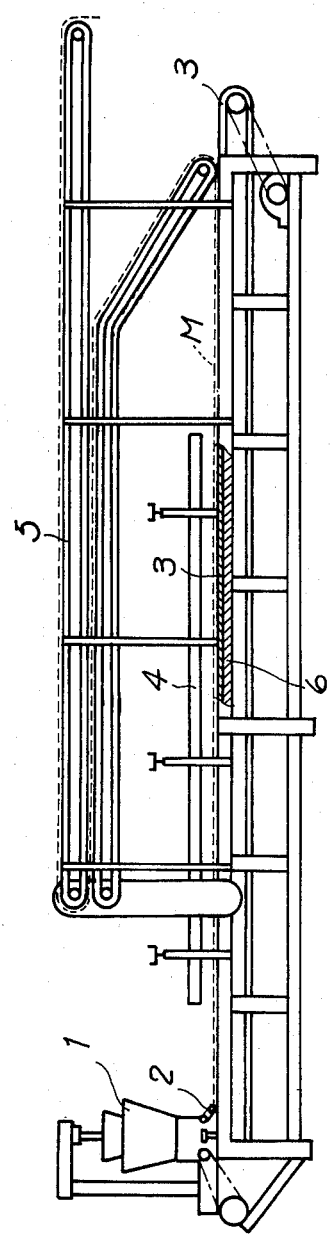

METHOD OF PREPARATION OF FISH-NOODLE

BACKGROUND OF THE INVENTION

This invention relates to a method of preparation of fish-noodle(a mixture of fish meat and noodle). [fish meat (hereinafter refered as "fish")].

The method of preparation of the fish-noodle which has been conventionally used as a processed goods of fish, has been carried out by the following order.

(1) mashed materials are put into a vessel having a cylindrical type, a rectangular type or the like.

(2) a plate is inlaid at the bottom of the vessel, said plate being provided with holes having each equal size according to a requested size of the product.

(3) a pressure is applied to the vessel so as to push out said product mechanically or manually to push into a boiling water or a saline hot water.

(4) after boiled said product ripely, it is washed with water while cooling.

In this case, however, since the mashed materials are ripely boiled in the hot water or the saline hot water directly, a taste of the essential mashed material itself is dissolved into the saline hot water to damage the taste. Further, in order to push out the mashed materials contained in the vessel from it, the length to that of the vessel. Accordingly, since it is impossible to cut the product to an proper length, such means as cutting smaller or the like must be taken for obtaining a fixed length of the product. Furthermore, in case of pushing out of the vessel, its amount is not fixed and sometimes out of standard. Still further, since the pushing out operation under a pressure is repeated after filling it in the vessel, a continuous production is impossible and thus it is not appropriate to a large amount of production.

SUMMARY OF THE INVENTION

This invention is to provide the most suitable method of preparation for eating it like noodle by intending the homogenizing of each fibrous body cut to be slender in consideration of the conditions described above. For this purpose, in this invention, the mashed fish paste material is allowed to be formed like a sheet having a good heat conductivity to treat a heat treatment. In other words, this invention is characterized by forming the mashed material like a sheet, cutting it(in a transverse direction) slenderly after heating and cooling, then cutting it to a suitable length and finally washing it.

BRIEF DESCRIPTION OF THE DRAWINGS

FIG. 1 is a side view of an apparatus used for this invention.

DETAILED DESCRIPTION OF THE INVENTION

In this invention, as the fish paste material, additives such as sugar, the white of egg, mirin(sweet Japanese Sake), starch etc. are used other than the mashed fish and a salt used for gel formaton. The fish is used after removing uneatable portions such as bones, internal organs and the like from the fish body. The fish is mashed with a mashed device, or the like and said salt and additives are added therein in the case of mashing. In this case, the gel formation occurs together with the mashing of fish. The mashed fish paste material is then formed like a sheet.

As a sheet shape, it may be a plane circular shape other than a plane rectangular shape and its thickness is decided in consideration of the touch in eating and the efficiency of heat conductivitiy in the after-process, thereby selecting the range within 1 to 3 mn. in thickness suitably. The sheet shape material thus formed is provided to a heating process and then a cooling process. In the heating process, the sheet shape material is heated at 60° to 80° C. to intend the extinction of bacteria mixed therein and the inactivation of enzyme. As the heating means, a steam chamber and an oven etc. are selected. However, in order to perform a uniform heating, infrared rays may be used. In this heating, the shape of the fish paste material is like a sheet and the heat is effectively transmitted to the surface and the inner portions thereof due to the thin thickness of said material. Accordingly, both the inner and surface portions occur the "light elastic force" uniformly, and a uniform "crisp condition" is formed as a whole. Further, the heating time can be shortened due to its thin thickness, thereby being able to increase the productivity thereof. The sheet shape material thus obtained as a solid gel by heating is then cooled down. The cooling may be carried out either in an air or in a refrigerated chamber, said cooling being performed until the inner portion of the sheet shape material becomes to a room temperature or below it. In such a cooling, due to the thin thickness of said material the cooling time is extremely shortened. After cooling, said sheet material is cut to be slender and then cut to a suitable length to separate the cut material as slender fibrous bodies. This separation is carried out so that the cut materials may be 0.5 to 1.5 in width and 10 cm in length. The washing is carried out by putting the fibrous body into the saline water with stirring suitably to remove the "slippery" on the surface of the fibrous body. By this, the viscosity on the surface of fibrous body is removed to some extent, whereby the luster is provided to the product which causes the apparent beauty and the appetite together with furnishing a meal like a noodle. The fibrous body thus prepared is fed being packed with a fixed amount per one pack. Accordingly, it is not only possible to eat it like the noodle in a home, but also to avail it to a vinegared dish or a soup bowl.

FIG.1 represents a preparing machine which can prepare such product continuously. The mashed material is put into a forming machine 1(extruder) and the sheet-like material M is pushed out from a nozzle 2. The sheet-like material is transferred in the right direction by a conveyor 3, and subjected to the heat treatment during the conveyance. For this purpose infrared rays burners 6 are provided with a proper distance under a plate conveyor 3. Further, the numeral 4 is a team tube which jets steam to the sheet-like material on the plate conveyor 3. The sheet-like material conveyed with the plate conveyor thus being heated is then heated. The cooling is effected during the conveyance of the sheet-like material by a second plate conveyor 5 which operates upper the plate conveyor 3. In other words, the sheet-like material is allowed to cool. At the end portion of the second plate conveyor 5, a cutter is provided (not shown), by which the sheet-like material is cut. As such cutter, e.g. a noodle cutter and the like are used.

According to this invention, since the fish paste material is formed like a sheet and the heating is performed to provide "a light elastic force", the homogenization of the "crisp condition" in taste is obtained, thereby being able to obtain a good gel shape material.

What I claim is :

1. A method of preparing fish-noodle, comprising the steps of:

continuously forming a mashed fish paste into a thin sheet;

heating both surfaces of said sheet with infrared rays in an oven at a temperature of about 60° to about 80° C. to destroy bacteria and obtain a gel-like sheet;

subsequently cooling said sheet to at least about room temperature;

cutting said cooled sheet with a noodle cutter into slender fibrous bodies having a predetermined width and length; and washing said cut slender fibrous bodies with saline water.

2. A method according to claim 1 wherein said mashed fish paste further comprises sugar, egg white, mirin and starch other than salt.

3. A method according to claim 1 wherein the thickness of the sheet is 1 to 3 millimeters and wherein the width and the length of the cut slender fibrous bodies are about 0.5 to 1.5 millimeters and about 10 centimeters, respectively.

* * * * *